(12) United States Patent
Farver et al.

(10) Patent No.: US 9,043,297 B2
(45) Date of Patent: May 26, 2015

(54) SYSTEM AND METHOD FOR MODE-BASED SOCIAL NETWORKING

(71) Applicants: Brandon Farver, Fountain Hills, AZ (US); David Ebel, Gilbert, AZ (US)

(72) Inventors: Brandon Farver, Fountain Hills, AZ (US); David Ebel, Gilbert, AZ (US)

(*) Notice: Subject to any disclaimer, the term of this patent is extended or adjusted under 35 U.S.C. 154(b) by 249 days.

(21) Appl. No.: 13/845,917

(22) Filed: Mar. 18, 2013

(65) Prior Publication Data

US 2013/0246397 A1  Sep. 19, 2013

Related U.S. Application Data

(60) Provisional application No. 61/612,625, filed on Mar. 19, 2012.

(51) Int. Cl.
*G06F 17/30* (2006.01)
*G06Q 50/00* (2012.01)
*G06Q 10/10* (2012.01)
*G06Q 30/02* (2012.01)

(52) U.S. Cl.
CPC .......... *G06F 17/30554* (2013.01); *G06Q 50/01* (2013.01); *G06Q 10/107* (2013.01); *G06Q 30/0261* (2013.01); *G06Q 30/0254* (2013.01); *G06Q 30/0252* (2013.01)

(58) Field of Classification Search
USPC ................... 707/705–722; 705/319; 370/338
See application file for complete search history.

(56) References Cited

U.S. PATENT DOCUMENTS

| | | | |
|---|---|---|---|
| 6,186,793 B1 * | 2/2001 | Brubaker | 434/107 |
| 7,080,139 B1 | 7/2006 | Briggs et al. | |
| 7,856,360 B2 | 12/2010 | Kramer et al. | |
| 8,019,692 B2 | 9/2011 | Rosen | |
| 8,122,137 B2 * | 2/2012 | Appelman et al. | 709/229 |
| 8,219,317 B2 * | 7/2012 | Berot et al. | 701/425 |
| 8,562,439 B2 * | 10/2013 | Shuman et al. | 463/42 |
| 8,667,148 B1 * | 3/2014 | Turner | 709/228 |
| 8,892,094 B2 * | 11/2014 | Lindoff et al. | 455/434 |
| 2004/0006478 A1 * | 1/2004 | Alpdemir et al. | 704/275 |
| 2005/0182767 A1 * | 8/2005 | Shoemaker et al. | 707/10 |
| 2007/0150444 A1 * | 6/2007 | Chesnais et al. | 707/3 |
| 2009/0011744 A1 | 1/2009 | Daley | |
| 2009/0082038 A1 | 3/2009 | McKiou et al. | |
| 2009/0216551 A1 | 8/2009 | Chen et al. | |
| 2010/0008255 A1 | 1/2010 | Khosravy et al. | |
| 2010/0070577 A1 | 3/2010 | Relyea et al. | |
| 2010/0287282 A1 | 11/2010 | MacLaughlin | |

(Continued)

FOREIGN PATENT DOCUMENTS

RU    2391700 C2    4/2009
RU     114185 U1    3/2012

*Primary Examiner* — Hanh Thai
(74) *Attorney, Agent, or Firm* — Booth Udall Fuller, PLC

(57) ABSTRACT

A mode-based method of social networking comprising storing in a database profile information for a plurality of users, event information for a plurality of events and a mode associated with each event, receiving by a plurality of computerized user devices a selection of a mode and one or more geographic proximity parameter selections from a each of plurality of users, displaying, event information for an event having a same mode as the first user, profile information for one or more other users among the plurality of users having selected the same mode as the first user and located within a geographic proximity parameter selected by the first user, and a density of a plurality of users located within the geographic proximity parameter selected by the first user wherein the density is represented by a color corresponding to the mode.

20 Claims, 13 Drawing Sheets

(56) References Cited

U.S. PATENT DOCUMENTS

| | | |
|---|---|---|
| 2011/0065376 A1 | 3/2011 | Forutanpour et al. |
| 2011/0083101 A1 | 4/2011 | Sharon et al. |
| 2011/0142016 A1 | 6/2011 | Chatterjee |
| 2011/0179064 A1 | 7/2011 | Russo |
| 2011/0185008 A1 | 7/2011 | Tuan et al. |
| 2012/0036181 A1* | 2/2012 | Isidore .................. 709/203 |

* cited by examiner

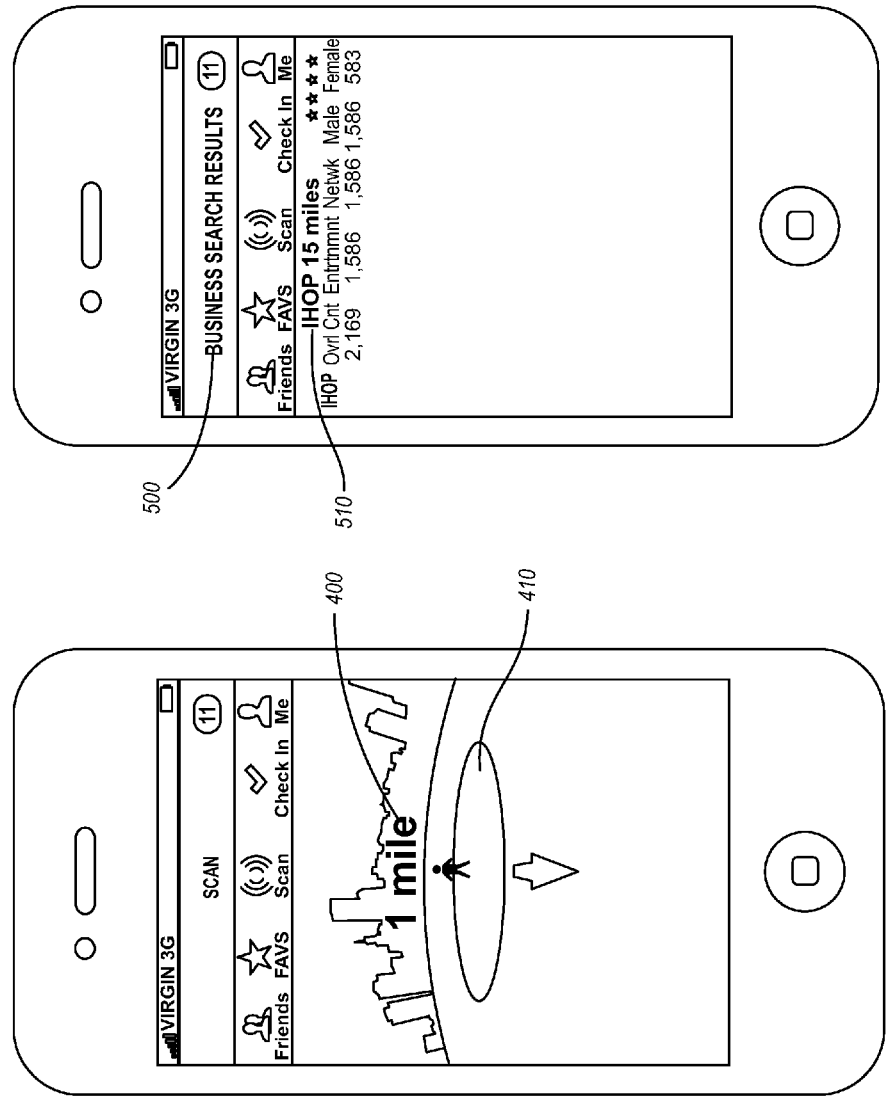

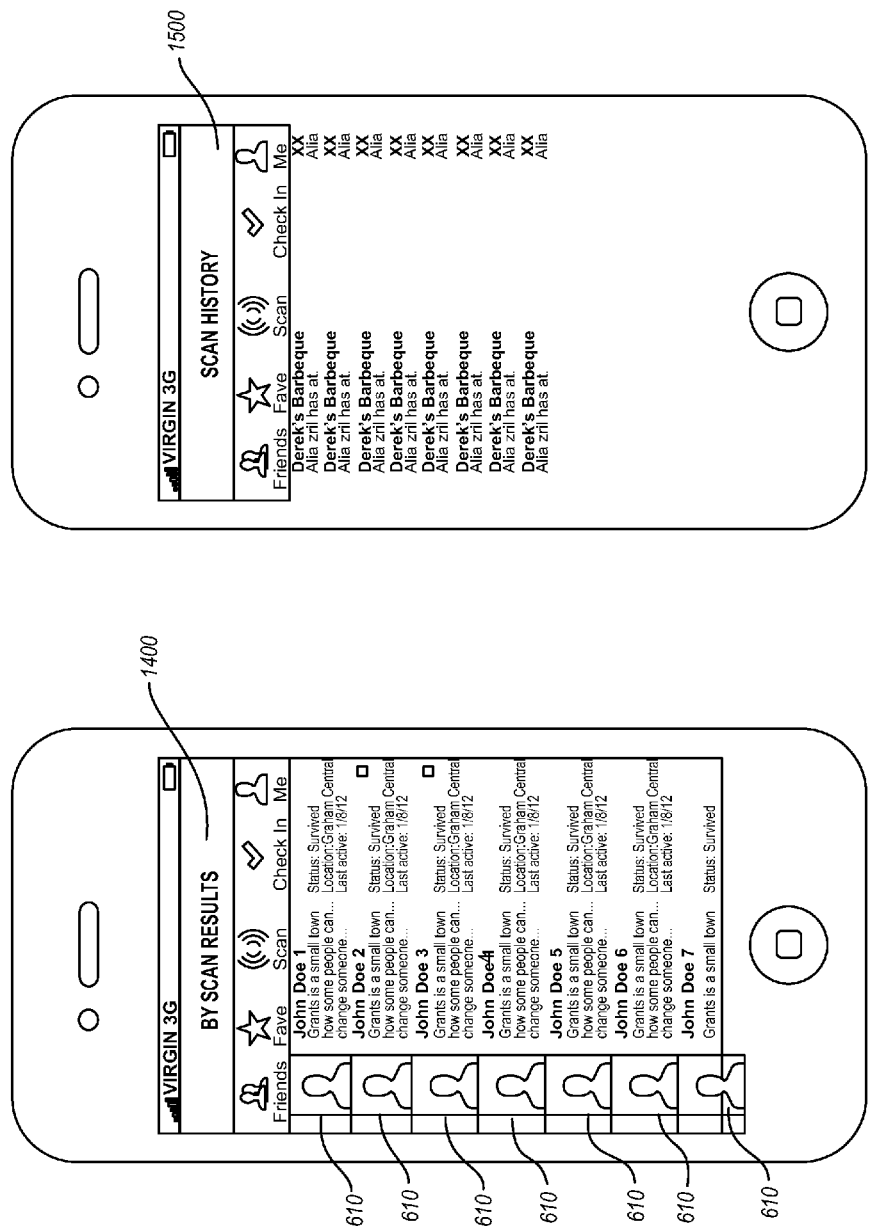

FIG. 18

SYSTEM AND METHOD FOR MODE-BASED SOCIAL NETWORKING

CROSS REFERENCE TO RELATED APPLICATIONS

This document claims the benefit of the filing date of U.S. Provisional Patent Application No. 61/612,625, entitled "System and Method for Mode-Based Social Networking Using a Web-Based Interface" to Brandon Farver, et al., which was filed on Mar. 19, 2012, the disclosure of which is hereby incorporated entirely by reference herein.

BACKGROUND

1. Technical Field

Aspects of this document relate generally to a social networking application.

2. Background Art

Currently, a variety of social networking web-based applications exist (e.g. Facebook®, MySpace®, LinkedIn®, etc.) that offer users the ability to interact and receive updates and other informational content from other users with whom they have previously established a connection or a "friend" relationship with. Just as with the vast array of general information available via the Internet, social networking application users are inundated with information from other users that is not relevant to the users' current interests based on the current mood, desires, or activities of the user. For example, a Facebook® user who is currently at a nightclub with friends and checks the user's homepage looking for other friends who are out on the town and may like to join the party also sees updates from friends that have no relevance to the user's current goal (e.g. photos of friends' children, upcoming business networking events, etc.). The user must then sort through all of the non-relevant information to find the relevant information that the user is seeking which results in a time-consuming and inefficient manner of social networking due to a lack of efficiency in finding relevant, timely content.

SUMMARY

Implementations of a mode-based method of social networking may comprise storing in a database, profile information for a plurality of users, event information for a plurality of events, and a mode associated with each event among the plurality of events. The method may further comprise receiving by a plurality of computerized user devices a selection of a mode by each of a plurality of users and one or more geographic proximity parameter selections from a each of plurality of users, displaying, by the computerized user device of a first user event information for an event among the plurality of events stored in the database having a same mode as the first user, profile information for one or more other users among the plurality of users having selected the same mode as the first user and located within a geographic proximity parameter selected by the first user, and a density of a plurality of users located within the geographic proximity parameter selected by the first user wherein the density of users among the plurality of users located within the geographic proximity parameter selected by the first use of users having selected the same mode as the first user is represented by a color corresponding to the mode.

Particular aspects may comprise one or more of the following features. The method may further comprise receiving, by the computerized user device of the first user, a message from the first user, the message from the first user comprising text directed to another user among the plurality of users having selected the same mode as the first user and transmitting, by the computerized user device of the first user, the message to a computerized user device of a second user that is among the plurality of users having selected the same mode. The method may further comprise receiving by the computerized user device of the first user, a profile privacy selection that designates a level of profile information that is displayed to other users having selected the same mode as the first user. The method may further comprise receiving, by the computerized user device of the first user, a request from the first user to create a group of users among the plurality of users having selected the same mode as the first user. The one or more geographic parameters may comprise a radial proximity to a location of the first user. The computerized user device of the first user may further comprise data exchange capability among one or more other computerized user devices within a predefined geographic proximity among a personal area network. The method may further comprise initiating, by the first user an information query that gathers and stores in the computerized user device of the first user profile information for a plurality of users within the personal area network that have previously selected the same mode as the first user. The method may further comprise receiving, by the computerized user device of the first user, a billboard input, transmitting the billboard input to a server, and transmitting to and displaying on the computerized user device of a second user that has selected the same mode as the first user, the billboard input.

The method may further comprise receiving, by the computerized user device of the first user, an input from the first user that comprises a future time duration over which all inputs from the user are designated as relating to an experience. The method may further comprise displaying, by the computerized user device of the first user, a challenge comprising a plurality of tasks to be completed by the first user, receiving, by the computerized user device of the first user, an acceptance input for the challenge from the first user, and displaying, by the computerized user device of the first user, one or more reminders of the plurality of tasks comprising the challenge.

Implementations of a computerized system for mode-based social networking may comprise a server configured to store in a database profile information for a plurality of users, event information for a plurality of events, and a mode associated with each event among the plurality of events. The system may further comprise a plurality of computerized user devices each configured to receive a selection of a mode by each of a plurality of users, and receive one or more geographic proximity parameter selections from each of the plurality of users wherein a computerized user device of a first user among the plurality of users is configured to display event information for an event among the plurality of events stored in the database having a same mode as the first user, profile information for one or more other users among the plurality of users having selected the same mode as the first user and located within a geographic proximity parameter selected by the first user, and a density of a plurality of users located within the geographic proximity parameter selected by the first user wherein the density of users among the plurality of users located within the geographic proximity parameter selected by the first use of users having selected the same mode as the first user is represented by a color corresponding to the mode.

Particular aspects may comprise one or more of the following features. The computerized user device of the first user may be further configured to receive a message from the first user comprising text directed to another user among the plurality of users having selected the same mode as the first user and transmit the message to a computerized user device of a second user that is among the plurality of users having selected the same mode. The computerize user device of the first user may be further configured to receive a profile privacy selection that designates a level of profile information that is displayed to other users having selected the same mode as the first user. The computerized user device of the first user may be further configured to receive a request from the first user to create a group of users among the plurality of users having selected the same mode as the first user. The one or more geographic parameters may comprise a radial proximity to a location of the first user. The computerized user device of the first user may further comprise data exchange capability among one or more other computerized user devices within a predefined geographic proximity among a personal area network.

The computerized user device of the first user may be further configured to generate a query that gathers and stores in the computerized user device of the first user profile information for a plurality of users within the personal area network that have previously selected the same mode as the first user. The computerized user device of the first user may be further configured to receive a billboard input and transmit the billboard input to the server and wherein the computerized user device of a second user that has selected the same mode as the first user is configured to receive the billboard input. The computerized user device of the first user may be further configured to receive an input from the first user that comprises a future time duration over which all inputs from the user are designated as relating to an experience. The computerized user device of the first user may be further configured to display a challenge comprising a plurality of tasks to be completed by the first user, receive, an acceptance input for the challenge from the first user, and display one or more reminders of the plurality of tasks comprising the challenge.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶ 6. Thus, the use of the words "function," "means" or "step" in the Description, Drawings, or Claims is not intended to somehow indicate a desire to invoke the special provisions of 35 U.S.C. §112, ¶ 6, to define the invention. To the contrary, if the provisions of 35 U.S.C. §112, ¶ 6 are sought to be invoked to define the claimed disclosure, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶ 6. Moreover, even if the provisions of 35 U.S.C. §112, ¶ 6 are invoked to define the claimed disclosure, it is intended that the disclosure not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIG. 4 depicts an exemplary screenshot of geographical parameter definition feature of an implementation of the system.

FIGS. 5-9 depict exemplary screenshots of search results and search options for an implementation of the system.

FIGS. 14-15 depict exemplary screenshots of search results of user devices having data exchange capability within a personal area network.

FIG. 18 depicts an example of a group page having event listings displayed in an implementation of the system.

DESCRIPTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention. It should be noted that there are many different and alternative configurations, devices and technologies to which the disclosed inventions may be applied. The full scope of the invention is not limited to the examples that are described below.

The following disclosure provides implementations of a system and method of mode-based social networking which may be utilized on mobile devices or other traditional computerized interfaces capable of providing a web-based user interface. The implementations disclosed herein provide a user with current, relevant information while filtering out irrelevant information that is not of current interest to the user thereby increasing the efficacy and utility of web-based social networking applications.

Figure 1:
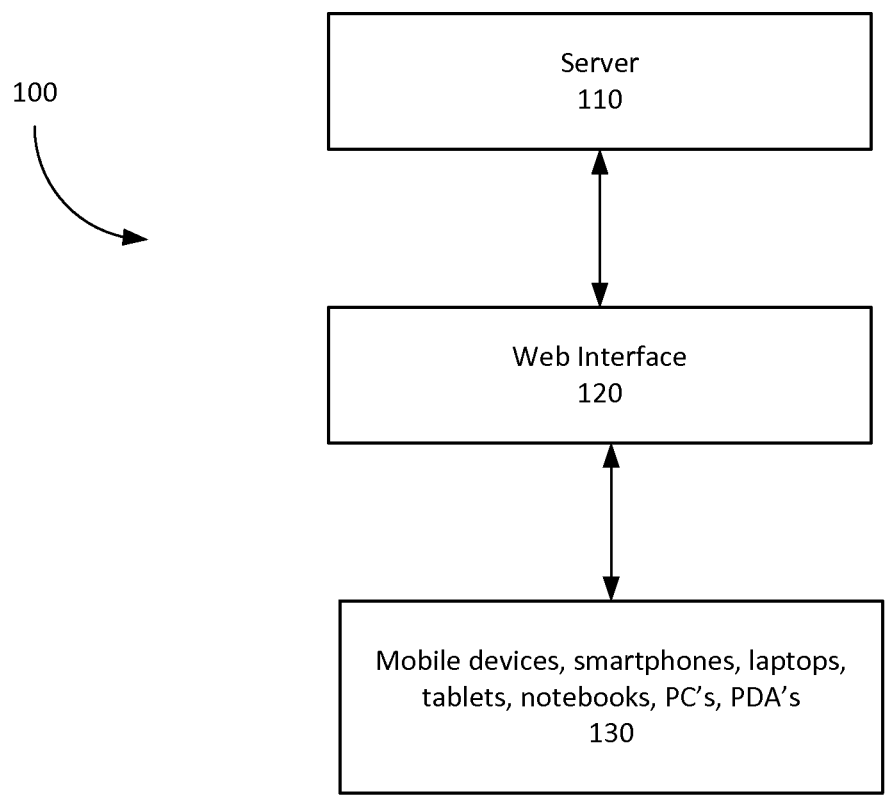
FIG. 1 is a block diagram of an implementation of a system of mode-based networking.

FIG. 1 provides a block diagram of an example of the components comprising an implementation of a system 100 for mode-based social networking. As shown, one or more servers 110 having access to or storing one or more databases comprising user profile information, group information, event information, mode information, geographic parameters, etc. may be in network communication through a web-based interface 120 with one or more other computerized devices, such as for example, computerized user devices 130. Some examples of computerized user devices 130 may include mobile devices such as mobile phones as well as computers such as laptops, PC's, net books, and tablets and any other appropriate computerized devices known to one of ordinary skill in the art. One of ordinary skill in the art would recognize that a user may comprise an individual, a business, a group, or any other entity that may engage in social networking.

Figure 3:
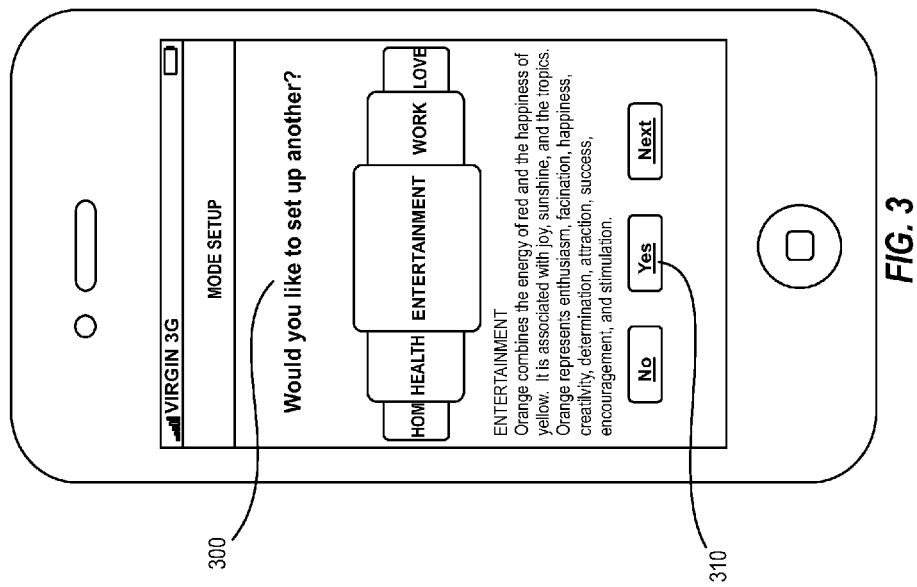
FIGS. 2-3 depict exemplary screenshots of mode selection and definition features of an implementation of the system.
Figure 2:
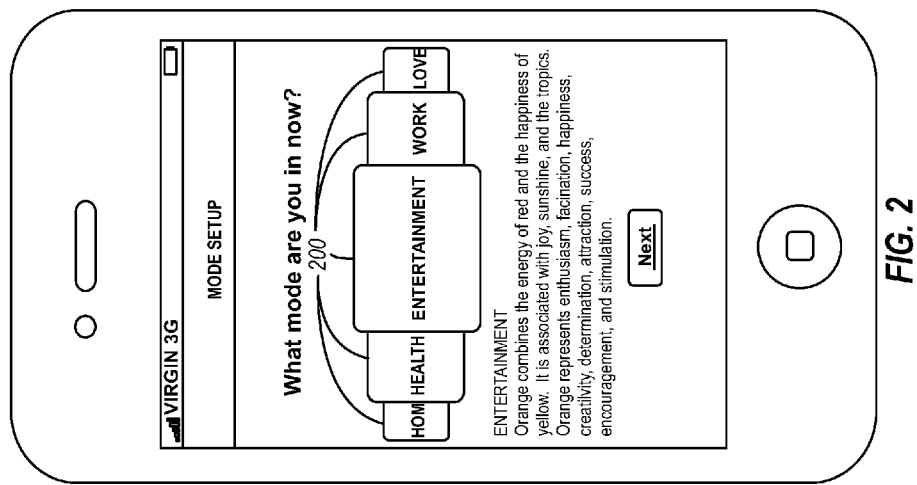

Implementations of the systems and methods disclosed herein provide the user with the ability to select from various modes that filter information available to the user according to predefined or user-customizable parameters. For example, the user is able to select from predefined modes such as party, recreation, work, home, business, networking, dating, food, entertainment, health, family, shopping, education, etc. As shown in FIG. 2, the display of a computerized user device may provide a textual or graphic depiction of various modes 200 available to the user. In some implementations, modes 200 may be represented by a predefined or user-defined color coding system which assigns a different shade or intensity of one or more colors to a particular mode. The ability of a user to change modes 200 based on current interest, mood, etc. allows the user to mine social networking information in a manner that provides the user with current, relevant information that is tailored to the user's current state of mind. For example, if a user chooses to select entertainment mode, information displayed to the user is only that information which is relevant to a person seeking to interact with other users who are in entertainment mode (e.g. location of nightclubs, location and density of other users in party mode who choose to allow their location to be shared among the social network). The user will not receive information that is only relevant to another mode, such as, for example, the location of a business networking meeting that is in progress. Additionally, some implementations may allow the user to define one or more new modes by selecting an affirmative response 310 in response to a prompt 300 asking whether a new and previously undefined mode is desired by the user, as shown in FIG. 3.

In some implementation, the user has the ability to check into their location using the user's geo location as determined by their mobile phone or other computerized user device. These check-ins may modes associated with them based upon the user's current mode selection at the time of the check-in. In some implementations, a user may be presented with the option to tag interests or designate one or more sub-modes. For example, when checking in, a user may choose the mode "Recreation" and then tag the check-in with interests such as "basketball" and/or "outdoor".

When a user checks in to a particular location, venue, or event, the user may also be prompted with an option to post a message, such as, for example, about what the user is doing at the location in the given mode. In addition, in some implementations, the user may post a short message bulletin or billboard message that is sensitive to the current time, duration of an event, and that location. For example, a user may use their computerized user device to input a billboard message letting people know that their basketball pick-up game is looking for more players. This billboard message may only be visible to other users who have selected a mode relevant to this activity and for a predetermined or user-specified duration of time. In some implementations, a user may upload and image, video, or other content which may be shared with other users in accordance with the user's privacy settings.

In some implementations, users may have an option to pre-check-in to a location, event, venue, etc. and this information may be posted to the user's profile and/or event, group, or other page in accordance with the user's privacy settings to allow the user to inform other users of the user's plans.

When checking in, the user may also have an ability to activate the a data exchange capability, such as Bluetooth® for use within the system that allows the user to post a "bulletin" or "billboard" message to the people in their immediate vicinity as defined by a personal area network. This message may only be available to the users who are within the geographic proximity of the personal area network.

When a user has selected a mode, the user is able to search for relevant venues, events, businesses, groups, etc. as well as for other users currently in the same mode as the user. This may be accomplished by allowing the user to set a geographic radius around the user's current location for which the user desires to receive information regarding venues, events, businesses, groups, and other users of interest. The geographic radius 400 may be set by reducing or enlarging a representation of a geographic radius 410 on the display screen as shown in FIG. 4, or by entering distance parameters.

Figure 6:
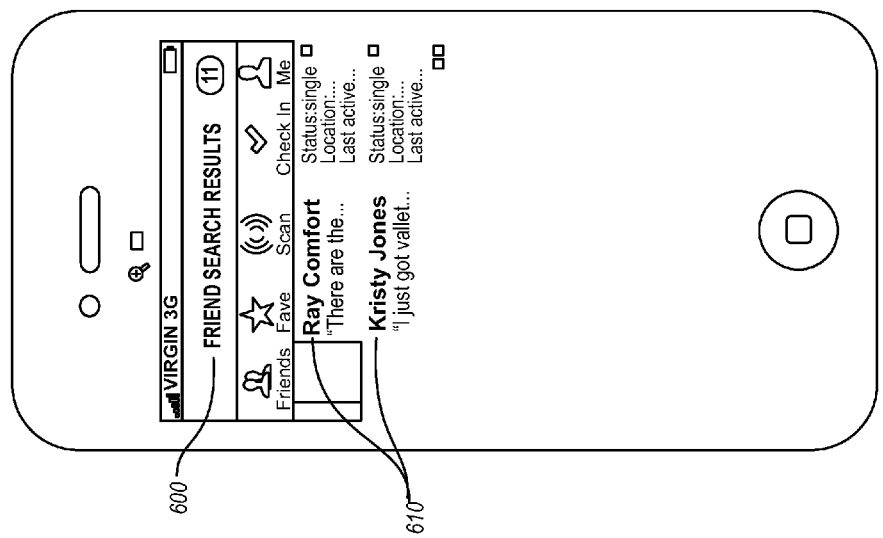

Alternatively, a search may be conducted based on an area enclosed by a "geo-fence." For example, a particular geo-fence may enclose a city's downtown area, a single venue, or any other relevant boundary that the user chooses to define. Within this "geo-fence", geographic radius, or other geographic proximity parameters input by the user, the user may conduct a search for other users, friends, businesses, venues, events, etc. that are within the user's geographic proximity parameters. FIGS. 5-6 provide exemplary screen shots of a computerized user device displaying one or more businesses 510 in a list of business search results 500, and a computerized user device displaying one or more of the user's friends 610 in a list of friend search results 600.

Figure 7:
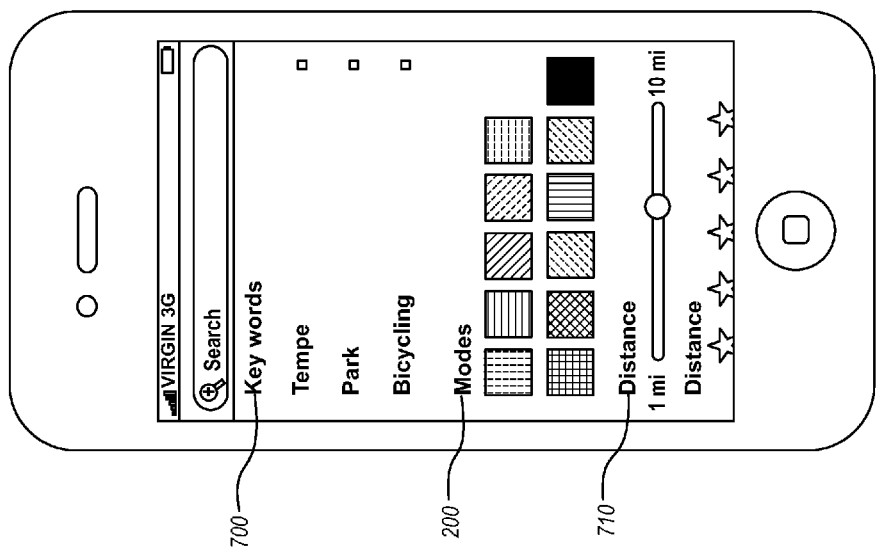

FIG. 7 provides an exemplary screenshot of a user's computerized user device showing an advanced search option screen that allows a user to search based on additional criteria such as, for example, key words 700, modes 200, geographic distance 710, and any other relevant characteristics. In addition, search results may also return "bulletin board" or "bill board" messages posted by other users that are relevant to the user's search parameters and/or type of search conducted. For example, a "geo-search" based on one or more geographic parameters will return messages that are designated by the poster of the message as being relevant to "geo-searching" and a Bluetooth® scan will return only those messages that are from the users in that immediate Bluetooth® area as these are the messages that are most relevant to a user conducting a Bluetooth® sweep.

In some implementations, users may apply one or more filters to improve the quality and relevance of the search results displayed. For example, a user could choose to sort search results according to the popularity or "hype" rating of the event, location, business, group, etc. as determined based on a level of interaction with other users such as a number of likes, followers, check-ins, etc. Additionally, search results may be displayed according to one or more mode-specific tags that are attached to an event, business, venue, location, group, etc. at the time of creation or added at a later time.

Figure 8:
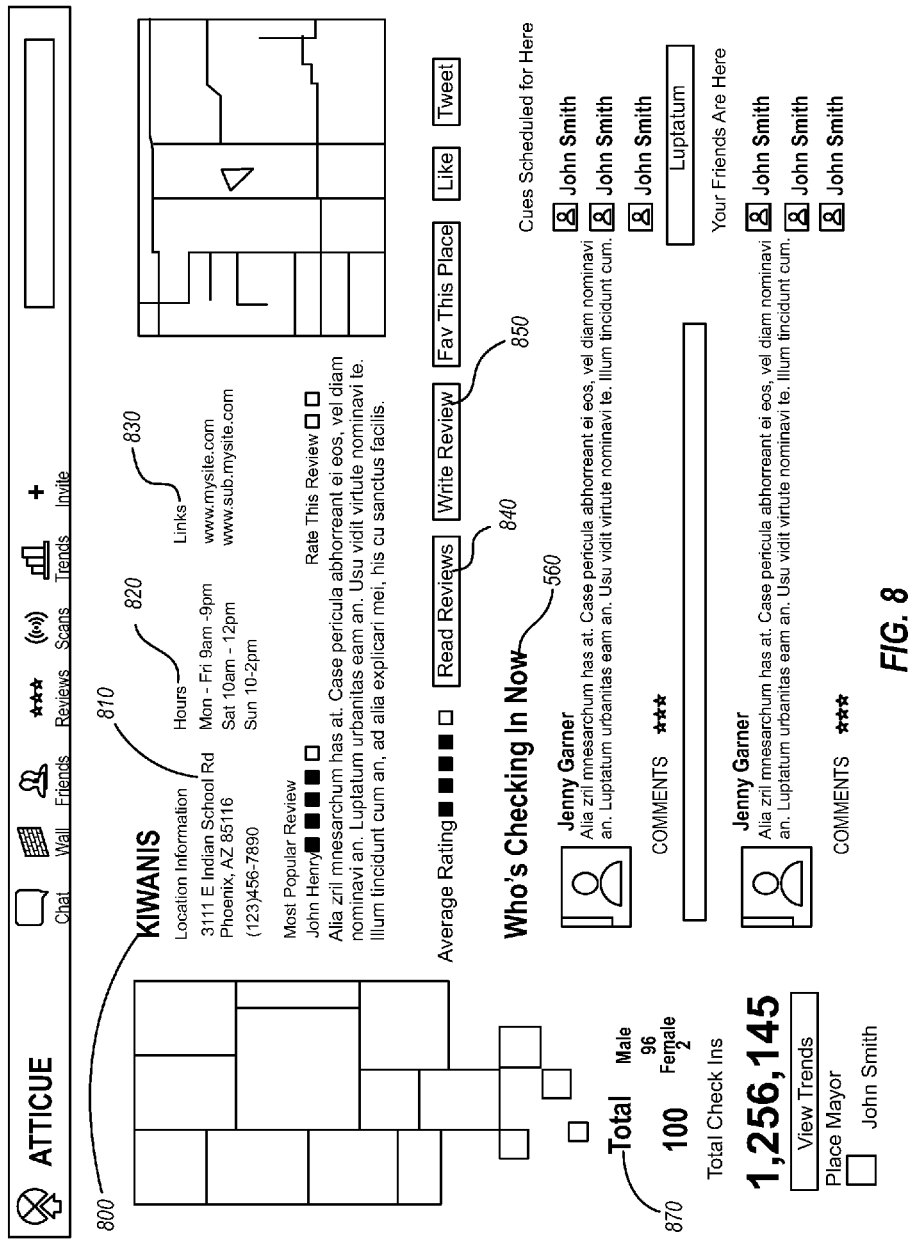

FIG. 8 provides an example of a business listing web page displayed on a computerized user device. As shown, this view provides more detail relating to a business and users interacting with the business. For example, in addition to the business name 800 and location information 810, other business information such as business hours 820 and related web links 830 may be displayed. Users may also read tips and reviews 840 posted by other users or write a tip or review 850 of the business. Additionally, in some implementations, users may have an option to designate the business in a list of favorites or link to other social media applications. As shown, in some implementations, a list of the most recently checked-in users 860 may displayed and a total of currently checked in users may also be displayed 870.

Figure 9:
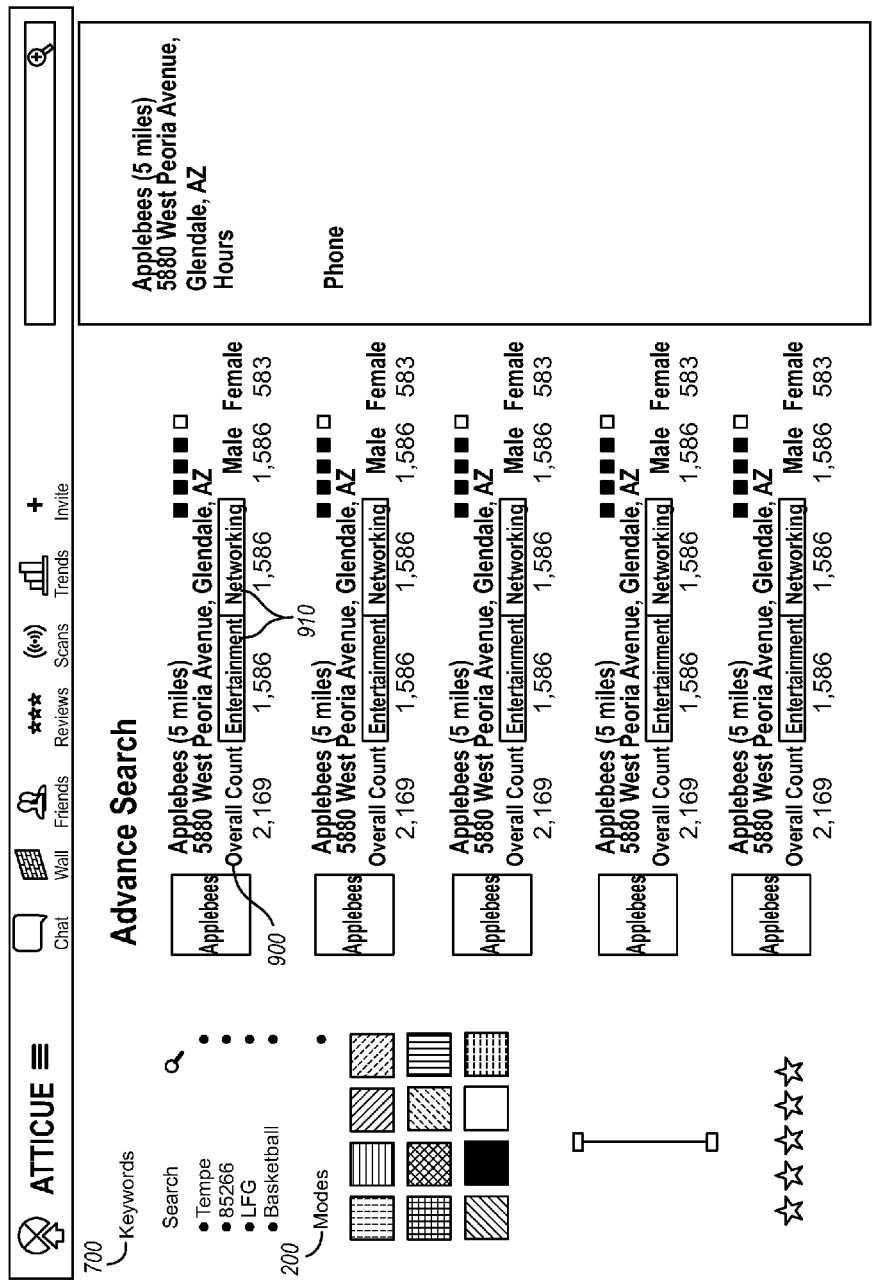

FIG. 9 also provides an alternative example of advanced search results displayed on a computerized user device. For example, in a list of advanced search results, a list of businesses, groups, venues, events, etc. may be displayed along with detailed information such as the overall count of total user check-ins at the business 900 and mode-based user check-in information 910 which provides a count of users who have previously checked in after having selected a particular mode.

In some implementations, a user has the ability to join existing groups or form new groups after selecting a particular mode in which the group is accessible. For example, if a user has selected a mode such as "Recreation" mode, and is looking for other users who are interested in playing a game of basketball, the user can search for other groups based on a geographic proximity, predefined geo-fence or other geographic proximity parameter to determine if there is a group of users within the user's geographic parameters that is already seeking basketball players or alternatively, if no such group exists, the user may choose to start a new group dedicated to this current activity. Groups may be controlled through a separate permissions structure. Just because a group member is associated with the user, it does not mean that the member necessarily has rights to see the user's main wall or profile. This allows for controlled communications without providing detailed personal information.

Figure 11:
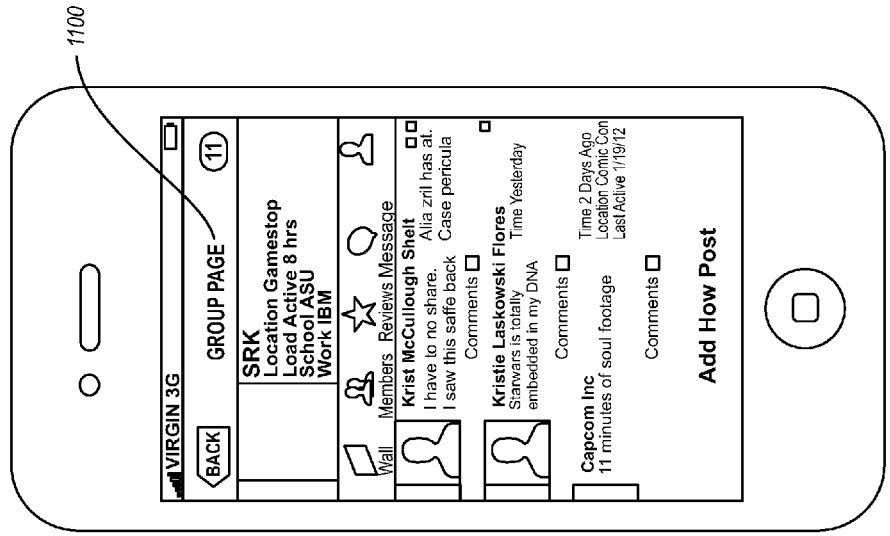
FIGS. 10-13 depict exemplary screenshots of group features of an implementation of the system.
Figure 10:
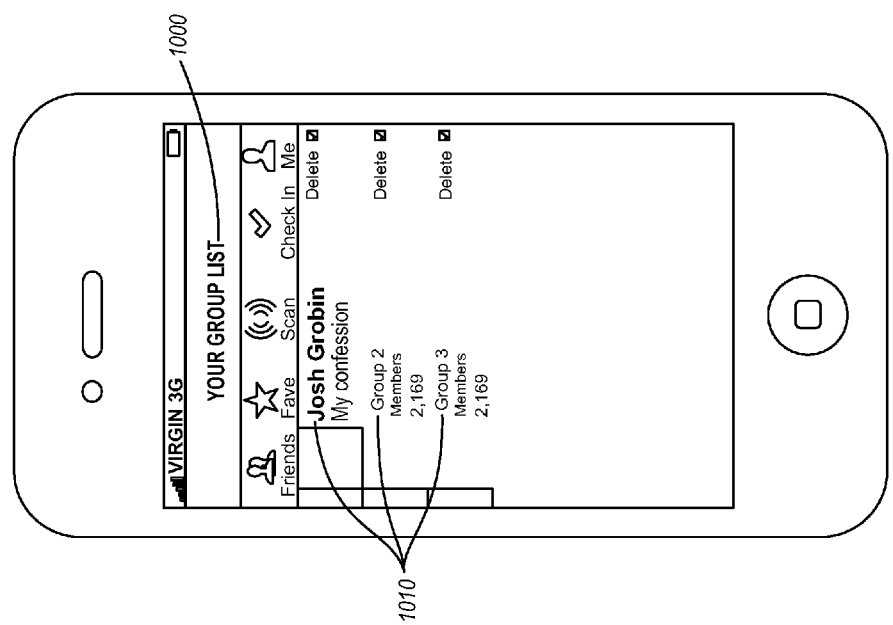
Figures 12, 13:
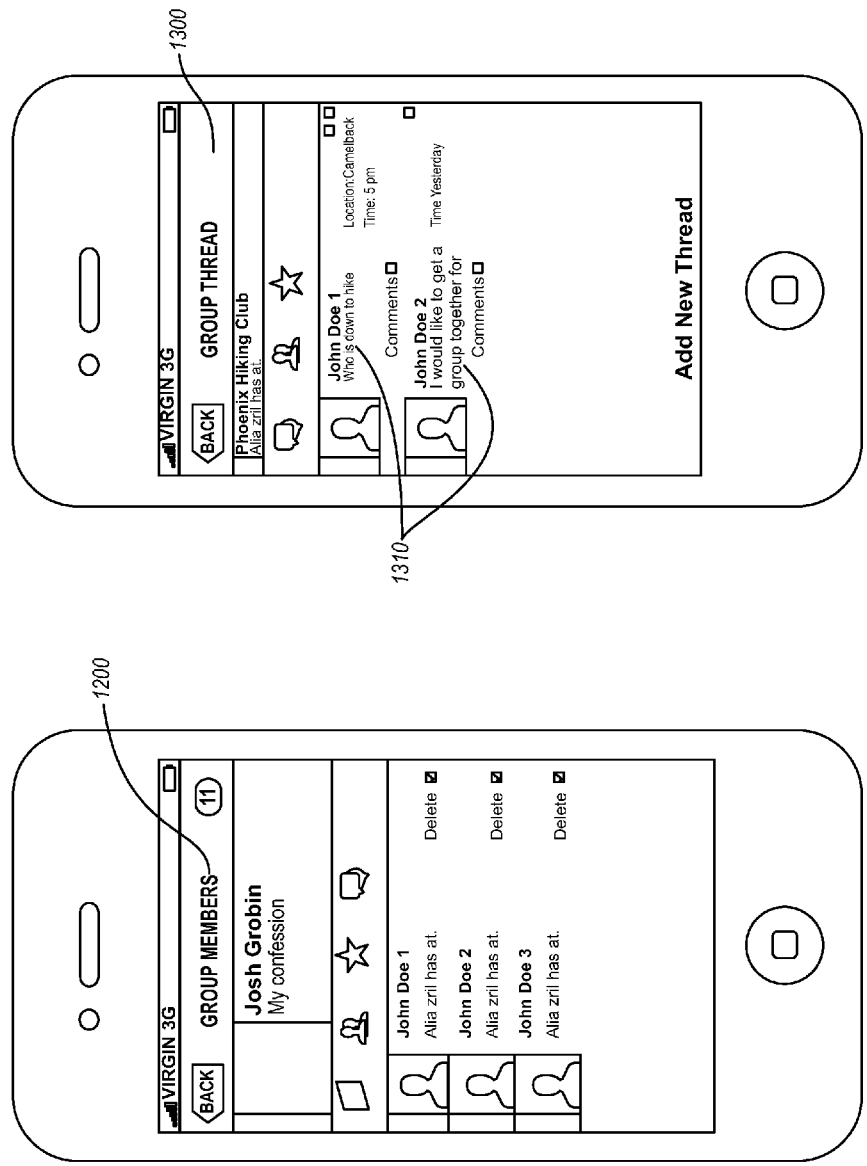

FIG. 10 provides an example of a list of groups 1000 as displayed on a computerized user device. As shown, each group 1010 may also have details such as a membership total or other relevant information displayed. FIG. 11 provides an exemplary screenshot of a group page 1100 as displayed on a computerized user device. Interactive content such as, for example, a list of members, comments, reviews, messages, etc. may be displayed on the group page. FIG. 12 provides an exemplary screenshot of a listing of group members 1200 which is accessible from the group page. Members may set their profile privacy options to limit the amount of their profile content that is available to other group members. As shown in FIG. 13, group members may communicate by posting messages 1310 to one or more group threads 1300, which may be predefined group threads based on a topic as determined by the group or newly created by a member of the group.

Figure 18:
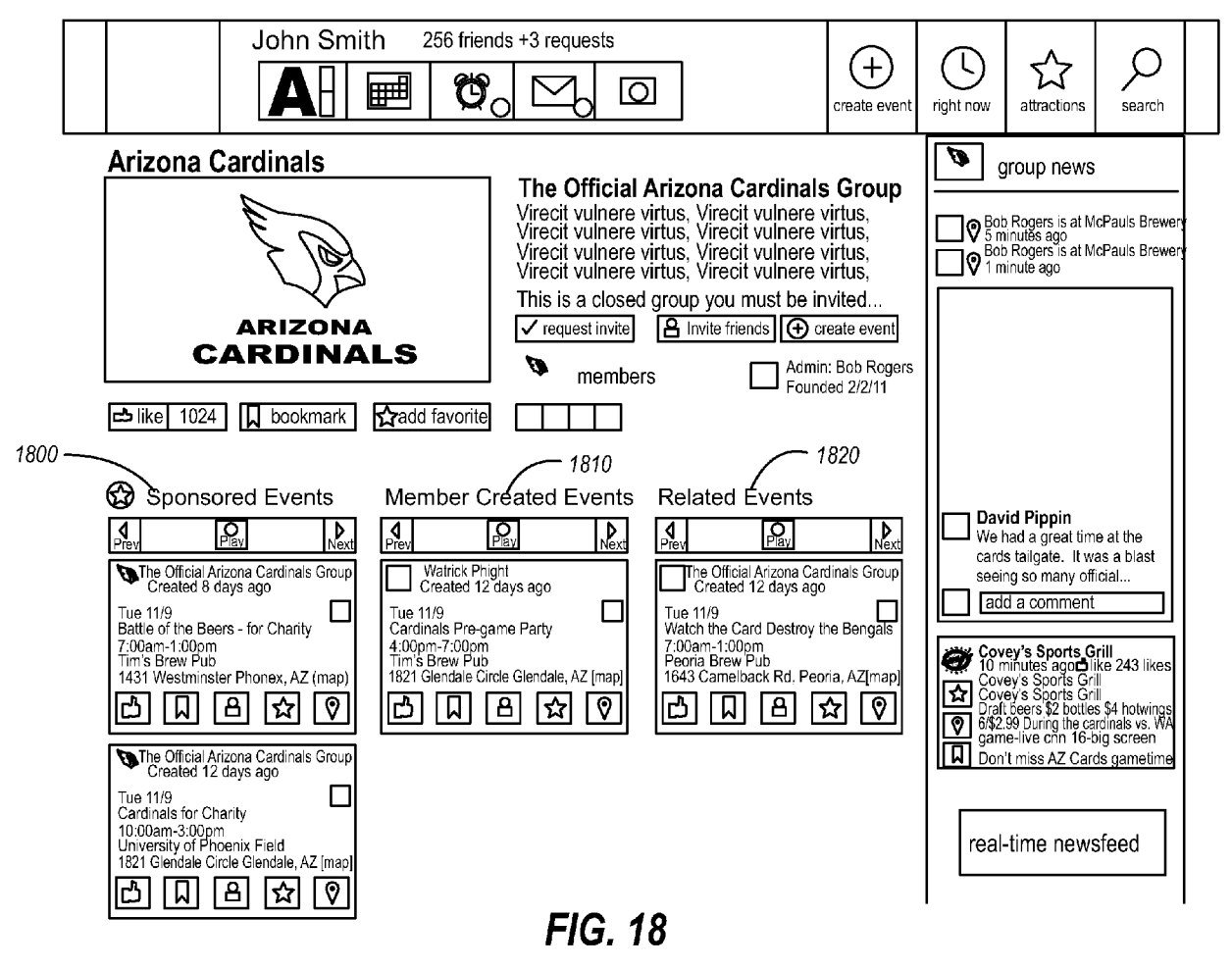

FIG. 18 depicts an alternative example of a group page as displayed on a computerized user device. As shown, a group page may comprise lists of events which may include, but are not limited to group-sponsored or official group events 1800, member-created events 1810, and related events 1820 which may bear some relevance to the group, but are not officially sanctioned by the group. Group news feeds, advertising, membership requests, and any other information relevant to the group may also be displayed.

Using a mobile or other device having data exchange capabilities such as, for example, Bluetooth® scanning technology, a user of an implementation of the disclosed system and method has the ability to perform a scan of personal area network located within a geographic proximity as defined by a predefined geo-fence or other geographic proximity parameters based on the user's current location to obtain profile information about other users who have chosen to share their profile information. An exemplary screen shot showing the results of such a data exchange scan 1400 is shown In FIG. 14.

Implementations of the disclosed system and methods may also have the ability to store the obtained profile information for later review and possible "friend" requests may be made using this or any other social networking platform. FIG. 15, below, shows an exemplary screenshot of historical data exchange scanning results 1500, which may be organized by location, date, and number of users found during the scan. Additionally, users having mobile devices integrating near field communications (NFC) or RFID technology can choose to transfer profile information by touching the two devices together or placing the devices in close proximity for an information exchange.

Figure 16:
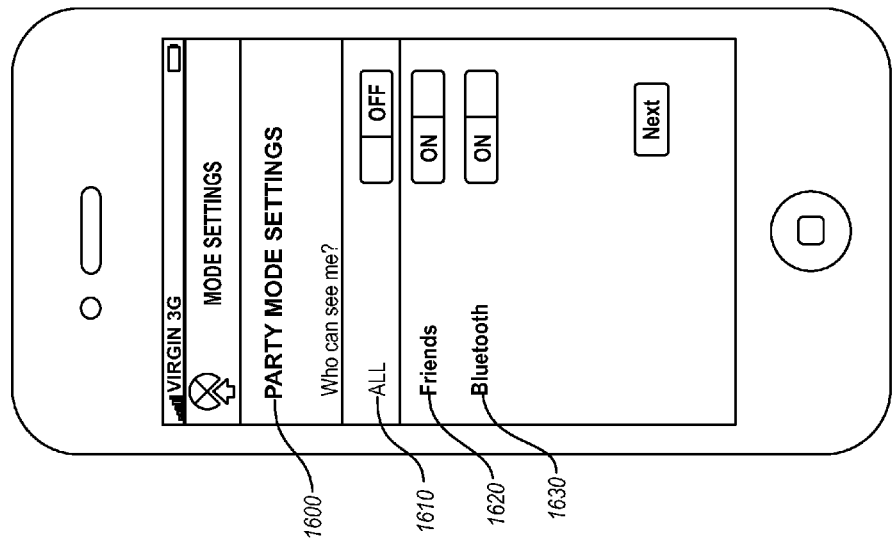
FIG. 16 depicts and exemplary screenshot of a privacy mode setting feature of an implementation of the system.

Implementations of the system and methods disclosed herein provide users with the ability to customize the level of profile information shared with others based on various factors. Each mode of the application has a predefined default setting for how much of the user's information is shared and a user may customize this default setting to fit the user's preferences regarding how much information the user wishes to share with whom as shown in FIG. 16. For example, a user may select a mode such as party mode and access a menu of customizable settings for that mode 1600. Options may be available so that the user may select whether all other users 1610 of the system, friends 1620, or users running a data exchange scan 1630 may view the user's profile information.

When searching for relevant venues, events, businesses, groups, users, etc., implementations of the system and method may allow users to search on a map for information relating to their own geographic location or a distant geographic location. Rather than displaying traditional "pins" locating items and people of interest on the map, a color-coded or pattern-coded population density of relevant venues, events, businesses, groups, users, etc., may be displayed in response to the user's search terms. This allows the user to view and approximate the relative number of venues, events, businesses, groups, users, etc. that are relevant to a particular mode at any given time. The user may also zoom to focus on a desired area within a geo-fence or other local or distant geographic area.

Figure 17:
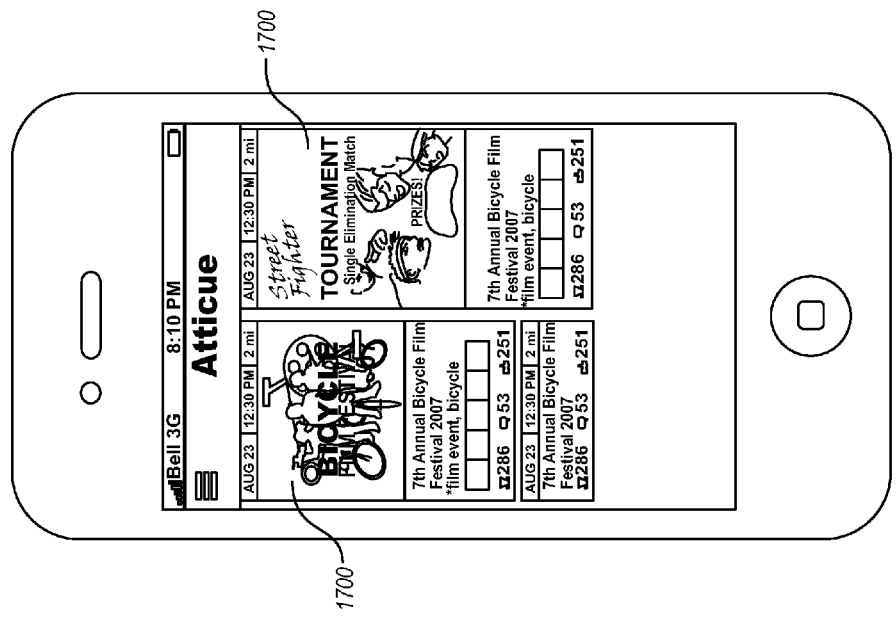
FIG. 17 depicts an exemplary screenshot of a display of event information in an implementation of the system.

FIG. 17 provides an example of relevant events 1700 as well as location, date, time, etc. information for such events as shown on a display of a computerized user device. Users may create new events by entering the relevant date, time, location, etc. information and in some implementations, may choose graphical elements which may be combined to form a customized event "poster" to advertise the event and attract interested users. When a user is interested in attending an event, the user may save the event to the user's calendar and may elect to receive reminders at predetermined or user-specified intervals prior to the event. In some implementations, users may purchase tickets to an event using their computerized user device.

Figure 19:
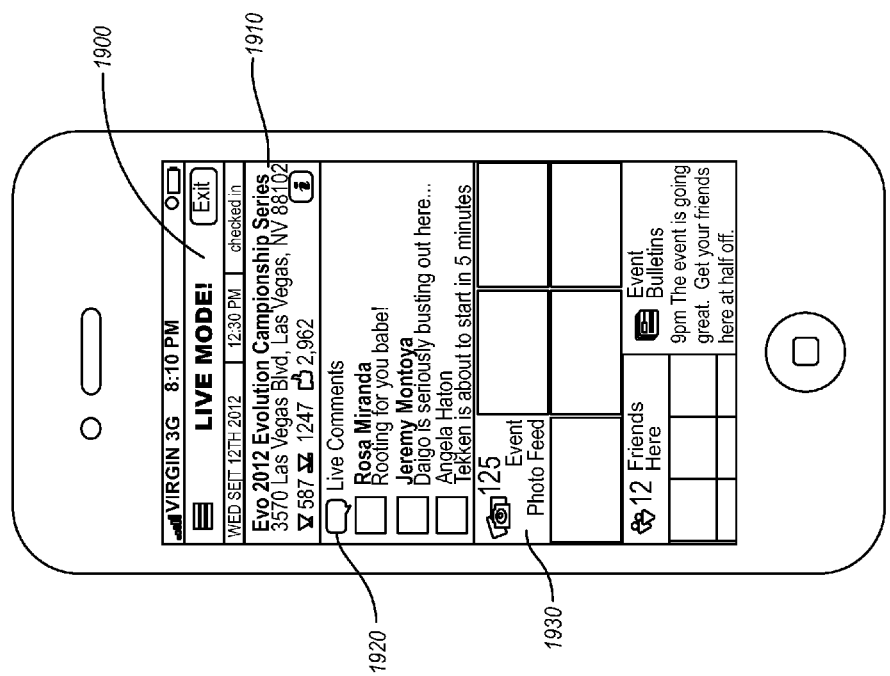
FIG. 19 depicts an exemplary screenshot of a live mode setting as displayed on a computerized user device.

FIG. 19 provides an exemplary screenshot of a computerized user device in live mode 1900, which displays a list of currently occurring events 1910, comments 1920, photos 1930, or any other time-relevant information based on the mode that the user has currently selected. In some implementations, a user may view the currently occurring content for multiple modes simultaneously.

Implementations of the systems and methods may rely on color coding based on modes so that a user can easily identify other users in that same mode as well as venues, events, groups, businesses, etc. that are pertinent to users in a particular mode. For example, users and venues, events, groups, and businesses pertaining to dating mode or love mode may be characterized with the color red which is typically associated with Valentine's Day, hearts, and other symbols suggesting love or romance.

In some implementations, a user may elect to engage in a challenge, which is comprised of a plurality of tasks that the user must complete in order to complete the challenge. The challenge may be associated with a group, event, venue, location, or the user may create a new challenge for the user and/or other users to participate in which may be suggested to one or more target users. Users may search for challenges based on the mode selected by the user, geographic proximity parameters, key words, and any other applicable search terms. Once a user has selected to accept a challenge, the one or more reminders of one or more upcoming tasks may be displayed on the user's computerized user device to encourage progress toward completing the challenge. The challenge and the tasks comprising the challenge may be stored into a calendaring system on the user's computerized device. Similar to a group, the challenge may have a "challenge home page" which displays relevant information such as the nature of the challenge, a list of participants, etc. Users may customize the privacy settings associated with the challenge to determine which other users may view their participation in the challenge. Challenges which are sponsored by a business or other group that offer a prize or some other compensation for completing the challenge may be considered to be contests.

In some implementations, a user may initiate a containerization of user inputs such as, for example, photos, videos, comments, historical check-ins, etc. that are automatically grouped into an experience. The user may elect to begin recording the inputs to the user's computerized user device for a predetermined time duration or the user may simply elect to begin the experience and later input a stopping time after which inputs to the computerized user device are no longer associated with the experience. For example, a user could initiate the experience of "My Vacation" by selecting an option to begin compiling all user inputs received by the computerized user device into the "My Vacation" experience when the user arrives at the airport on the first day of the trip. At the end of the user's vacation, the user may elect to end the experience and no further content will be added to the "My Vacation" experience. As an alternative to the spontaneous experience compilation, a user may also elect a predetermined block of time or duration of days, weeks, months, etc. over which all content will be associated with the experience and stored in an appropriate container. This prevents the user from engaging in the time-consuming task of organizing photos, videos, and other content into a portfolio or other container after the experience has already occurred to share on social networking platforms or for other relevant uses. Experiences may be shared with all, some, or no other users based on a privacy setting that the user may choose for the experience.

Implementations of the system and method described herein may also comprise one or more of the following features. Users may post a message visible to other users in a particular mode within a particular geographic location which acts as a "banner" to encourage social networking with other users in the area.

In some implementations, a user may bookmark an event, challenge, etc. which may then be placed in a secondary calendar on the user's computerized user device which may be used a secondary or back-up plan calendar in the event that the user's first plans are not undertaken.

Implementations of the system may also be a "learning" application that takes a user's past behavior such as check-ins at various locations, weekly habits, etc. to customize the user's experience based on the user's anticipated behavior. For example, if a user has consistently checked in at a bar or restaurant each Wednesday at 5:00 pm, at 4:30 pm on the next Wednesday afternoon, the user may receive a targeted advertisement for an establishment offering a happy hour special that afternoon that is located in close geographic proximity to the user's previously visited locations.

A user may have different profile pages that display different levels of information for different purposes (e.g. professional, non-professional) to minimize the number of different social networking media the user needs to sign up for to establish profiles for different purposes.

While the majority of this disclosure has discusses the features of the system and method pertaining to real-time social networking that allows users to access relevant social networking information based on their current selection of a mode, implementations may also be configured to allow a user to manage upcoming events for example, by creating a group of users that are invited to a dinner party at a restaurant. The restaurant then accesses this information and allows the designated users in the group to be seated thereby avoiding waiting in line to be seated.

In another implementation, the system and method may also be configured to act as a global events calendar that provides users with consistent, timely, and relevant information. Users, promoters, advertisers, and businesses may add future events to the calendar and users may then set reminders and check in for events prior to occurrence of the actual events. These calendar items may also be tagged according to their perspective "Mode" so that users can better filter the events that are of interest to them.

Implementations may also provide integrated and location-based task and goal reminders. For example, if a user is in work mode, the user's work related task reminders will be displayed. As another example, if a user has set a weight loss goal and the system detects that the user is at a fast food restaurant, a goal reminder will be displayed to discourage behavior that is inconsistent with the user's goals.

Lifestyle planning is also a feature of some implementations. For example, a user may check to find out how many people are currently at the user's gym and the system may then make a recommendation of a less crowded time for the user to visit the gym based on historical data regarding the average population density of users at the gym based on times of day.

Figure 20:
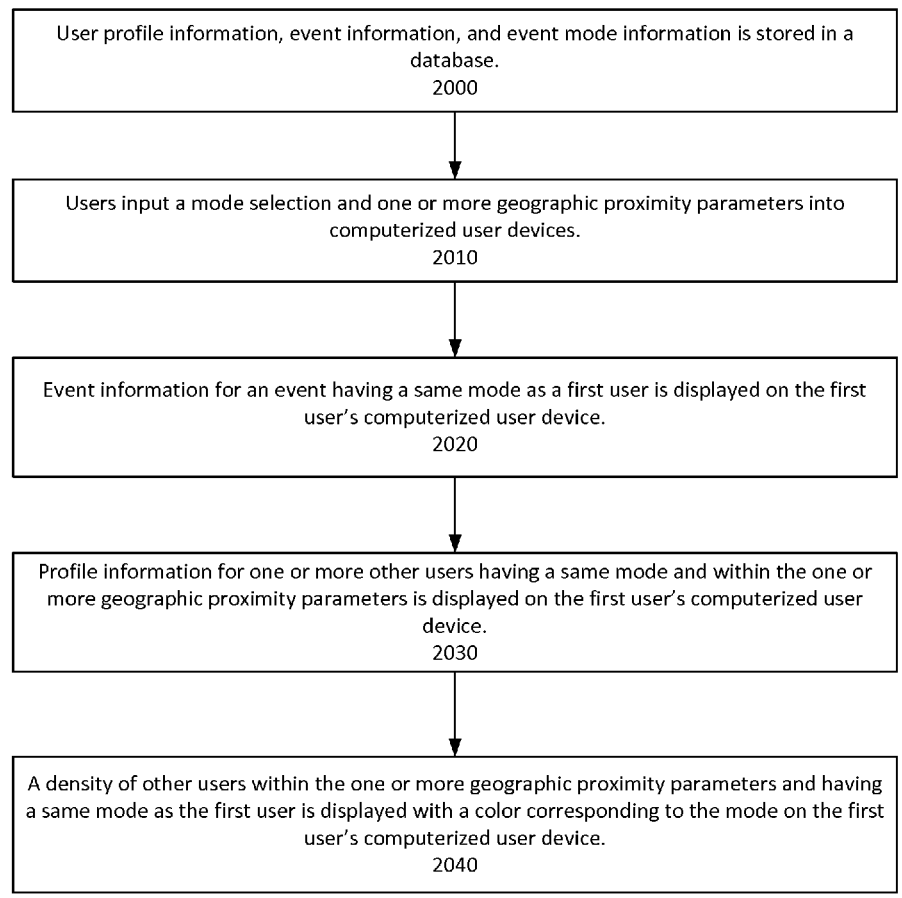
FIG. 20 is a block diagram of an implementation of a method of mode-based social networking.

FIG. 20 provides a block diagram of an implementation of a method of mode-based social networking. As shown, user profile information, event information, and mode information for events, users, groups, businesses, etc. is stored within a database 2000. The users of the system select a mode and designate one or more geographic proximity parameters in accordance with the implementations of the system described above 2010. A user may conduct a search based on keywords, mode, geographic proximity, or any other searching parameters in accordance with the above disclosure and search results are displayed on the computerized user device of the user. In some implementations, even information that has a same mode as the mode selected by the user is displayed on the user's computerized user device 2020. Profile information for one or more other uses that have selected a same mode as the user and are located within the one or more geographic parameters designated by the user may be displayed on the computerized user device 2030. The amount of profile information displayed to the user may be dependent upon the profile privacy setting selections made by the other users in accordance with the above disclosure. The computerized user device may also display a density of a plurality of other users located within the one or more geographic proximity parameters designated by the user using a color-coded mode-based density indication scale 2040. This density information displayed may be limited to only the same mode as the user had previously selected or may include multiple modes and colors to indicate the overall population of users and modes present within the one or more geographic parameters.

One of skill in the art will recognize that the methods of the present invention described above may be implemented as one or more software processes executable by one or more processors and/or one or more firmware applications. The processes and/or firmware are configured to operate on one or more general purpose microprocessors or controllers, a field programmable gate array (FPGA), an application specific integrated circuit (ASIC), or other hardware capable of performing the actions describe above. In an exemplary embodiment of the present invention, software processes are executed by a CPU in order to perform the actions of the present invention. Additionally, the present invention is not described with reference to any particular programming language. It will be appreciated that a variety of programming languages may be used to implement the teachings of the invention as described herein.

It is also to be understood that the methods may be employed with any form of memory device including all forms of sequential, pseudo-random, and random access storage devices. Storage devices as known within the current art include all forms of random access memory, magnetic and optical tape, magnetic and optical disks, along with various other forms of solid-state mass storage devices. The current invention applies to all forms and manners of memory devices including, but not limited to, storage devices utilizing magnetic, optical, and chemical techniques, or any combination thereof.

In places where the description above refers to particular implementations of mode-based social networking systems and methods, it should be readily apparent that a number of modifications may be made without departing from the spirit thereof and that these implementations may be applied to other embodiments of mode-based social networking systems and methods.

The invention claimed is:

1. A mode-based method of social networking comprising:
 storing in a database:
  profile information for a plurality of users;
  event information for a plurality of events; and
  a mode associated with each event among the plurality of events;
 receiving by a plurality of computerized user devices:
  a selection of a mode by each of a plurality of users; and
  one or more geographic proximity parameter selections from a each of plurality of users;
 displaying, by the computerized user device of a first user:
  event information for an event among the plurality of events stored in the database having a same mode as the first user;
  profile information for one or more other users among the plurality of users having selected the same mode as the first user and located within a geographic proximity parameter selected by the first user; and
  a density of a plurality of users located within the geographic proximity parameter selected by the first user wherein the density of users among the plurality of users located within the geographic proximity parameter selected by the first use of users having selected the same mode as the first user is represented by a color corresponding to the mode.

2. The method of claim 1, further comprising:
 receiving, by the computerized user device of the first user, a message from the first user, the message from the first user comprising text directed to another user among the plurality of users having selected the same mode as the first user; and
 transmitting, by the computerized user device of the first user, the message to a computerized user device of a second user that is among the plurality of users having selected the same mode.

3. The method of claim 1, further comprising receiving by the computerized user device of the first user, a profile privacy selection that designates a level of profile information that is displayed to other users having selected the same mode as the first user.

4. The method of claim 1, further comprising, receiving, by the computerized user device of the first user, a request from the first user to create a group of users among the plurality of users having selected the same mode as the first user.

5. The method of claim 1, wherein the one or more geographic parameters comprises a radial proximity to a location of the first user.

6. The method of claim 1, wherein the computerized user device of the first user further comprises data exchange capability among one or more other computerized user devices within a predefined geographic proximity among a personal area network.

7. The method of claim 6, further comprising initiating, by the first user an information query that gathers and stores in the computerized user device of the first user profile information for a plurality of users within the personal area network that have previously selected the same mode as the first user.

8. The method of claim 1, further comprising:
 receiving, by the computerized user device of the first user, a billboard input;
 transmitting the billboard input to a server; and
 transmitting to and displaying on the computerized user device of a second user that has selected the same mode as the first user, the billboard input.

9. The method of claim 1, further comprising:
 receiving, by the computerized user device of the first user, an input from the first user that comprises a future time duration over which all inputs from the user are designated as relating to an experience.

10. The method of claim 1, further comprising:
- displaying, by the computerized user device of the first user, a challenge comprising a plurality of tasks to be completed by the first user;
- receiving, by the computerized user device of the first user, an acceptance input for the challenge from the first user; and
- displaying, by the computerized user device of the first user, one or more reminders of the plurality of tasks comprising the challenge.

11. A computerized system for mode-based social networking comprising:
- a server configured to store in a database:
  - profile information for a plurality of users;
  - event information for a plurality of events; and
  - a mode associated with each event among the plurality of events; and
- a plurality of computerized user devices each configured to:
  - receive a selection of a mode by each of a plurality of users; and
  - receive one or more geographic proximity parameter selections from each of the plurality of users;
  - wherein a computerized user device of a first user among the plurality of users is configured to display:
    - event information for an event among the plurality of events stored in the database having a same mode as the first user;
    - profile information for one or more other users among the plurality of users having selected the same mode as the first user and located within a geographic proximity parameter selected by the first user; and
    - a density of a plurality of users located within the geographic proximity parameter selected by the first user wherein the density of users among the plurality of users located within the geographic proximity parameter selected by the first use of users having selected the same mode as the first user is represented by a color corresponding to the mode.

12. The system of claim 11, wherein the computerized user device of the first user is further configured to:
- receive a message from the first user comprising text directed to another user among the plurality of users having selected the same mode as the first user; and
- transmit the message to a computerized user device of a second user that is among the plurality of users having selected the same mode.

13. The system of claim 11, wherein the computerize user device of the first user is further configured to receive a profile privacy selection that designates a level of profile information that is displayed to other users having selected the same mode as the first user.

14. The system of claim 11, wherein the computerized user device of the first user is further configured to receive a request from the first user to create a group of users among the plurality of users having selected the same mode as the first user.

15. The system of claim 11, wherein the one or more geographic parameters comprises a radial proximity to a location of the first user.

16. The system of claim 11, wherein the computerized user device of the first user further comprises data exchange capability among one or more other computerized user devices within a predefined geographic proximity among a personal area network.

17. The system of claim 16, wherein the computerized user device of the first user is further configured to generate a query that gathers and stores in the computerized user device of the first user profile information for a plurality of users within the personal area network that have previously selected the same mode as the first user.

18. The system of claim 11, wherein the computerized user device of the first user is further configured to receive a billboard input and transmit the billboard input to the server and wherein the computerized user device of a second user that has selected the same mode as the first user is configured to receive the billboard input.

19. The system of claim 11, wherein the computerized user device of the first user is further configured to receive an input from the first user that comprises a future time duration over which all inputs from the user are designated as relating to an experience.

20. The system of claim 11, wherein the computerized user device of the first user is further configured to:
- display a challenge comprising a plurality of tasks to be completed by the first user;
- receive, an acceptance input for the challenge from the first user; and
- display one or more reminders of the plurality of tasks comprising the challenge.

* * * * *